(12) United States Patent
Jurado

(10) Patent No.: US 7,416,504 B2
(45) Date of Patent: Aug. 26, 2008

(54) LUBRICATION PLUG

(76) Inventor: Augusto Xavier Jurado, 2921 Cheryl Ct., Erie, PA (US) 16509

( * ) Notice: Subject to any disclaimer, the term of this patent is extended or adjusted under 35 U.S.C. 154(b) by 191 days.

(21) Appl. No.: 11/140,033

(22) Filed: May 29, 2005

(65) Prior Publication Data

US 2006/0063630 A1    Mar. 23, 2006

Related U.S. Application Data

(63) Continuation-in-part of application No. PCT/US2005/015589, filed on May 4, 2005, which is a continuation-in-part of application No. 11/056,989, filed on Feb. 11, 2005.

(60) Provisional application No. 60/568,377, filed on May 5, 2004.

(51) Int. Cl.
    *F16H 57/04* (2006.01)
(52) U.S. Cl. ............... 475/160; 475/159; 184/6.12; 74/467
(58) Field of Classification Search ............... None
    See application file for complete search history.

(56) References Cited

U.S. PATENT DOCUMENTS

| | | | | |
|---|---|---|---|---|
| 2,763,162 A * | 9/1956 | Herndon | ............. | 477/60 |
| 2,884,813 A * | 5/1959 | Kelley | ............. | 475/120 |
| 2,984,122 A * | 5/1961 | Woolley | ............. | 74/606 R |
| 3,770,074 A * | 11/1973 | Sherman | ............. | 180/65.6 |
| 4,922,765 A * | 5/1990 | Hayakawa et al. | ............. | 74/15.88 |
| 7,022,039 B2 * | 4/2006 | Hasegawa et al. | ............. | 475/159 |
| 2007/0017873 A1 * | 1/2007 | Jurado et al. | ............. | 210/695 |

* cited by examiner

*Primary Examiner*—David D. Le
(74) *Attorney, Agent, or Firm*—Steven M. McHugh; Carlos Hanze

(57) ABSTRACT

In an off-highway vehicle having an electric propulsion system which includes a motorized wheel, a traction motor and a transmission for transmitting power from the traction motor to the motorized wheel, wherein the transmission comprises a reduction stage, a low speed sun pinion defining a sun pinion cavity and a thrust washer, wherein the thrust washer includes a first surface portion movably associated with the low speed sun pinion via a thrust washer retainer and wherein the thrust washer is movably associated with the reduction stage via a lubrication plug is provided, wherein the lubrication plug includes a first plug portion having a radially extending portion movably associated with a second surface portion of the thrust washer and a second plug portion having a second plug portion structure which defines a plug cavity having a plug cavity inlet and at least one plug cavity outlet disposed adjacent at least a portion of the thrust washer, wherein the plug cavity inlet is disposed to communicate the sun pinion cavity with the plug cavity and wherein the at least one plug cavity outlet is disposed along at least one radial plane of the second plug portion to communicate the plug cavity with the thrust washer, such that a lubricant flowing through the sun pinion cavity and into the plug cavity inlet is allowed to flow out of the at least one plug cavity outlet such that the lubricant and the thrust washer lubricatingly interact.

28 Claims, 11 Drawing Sheets

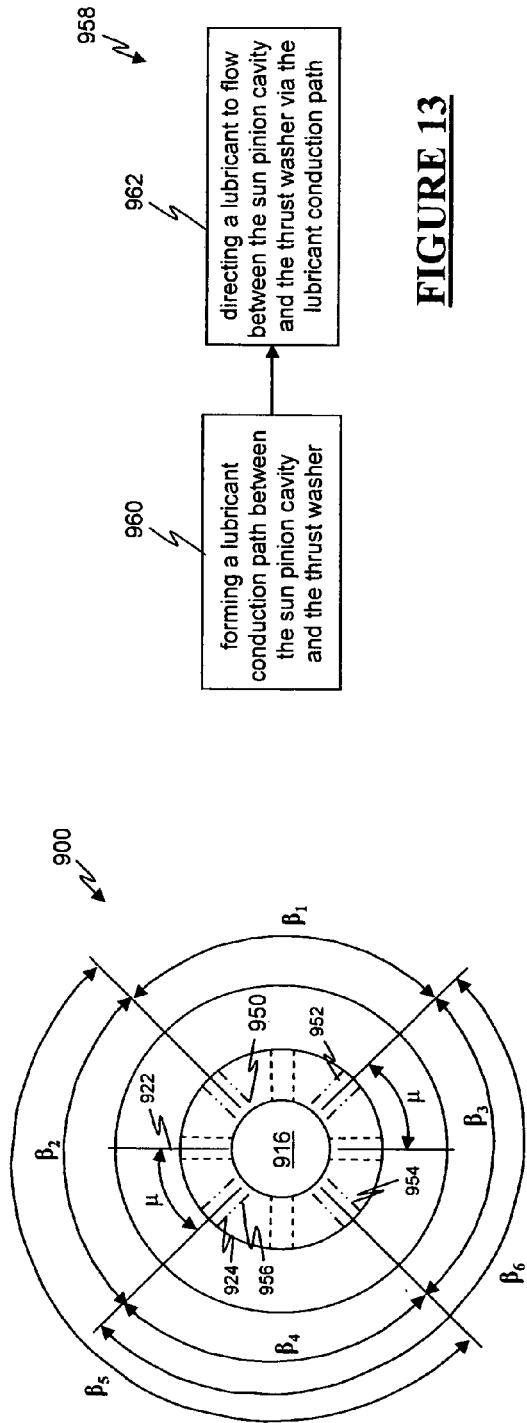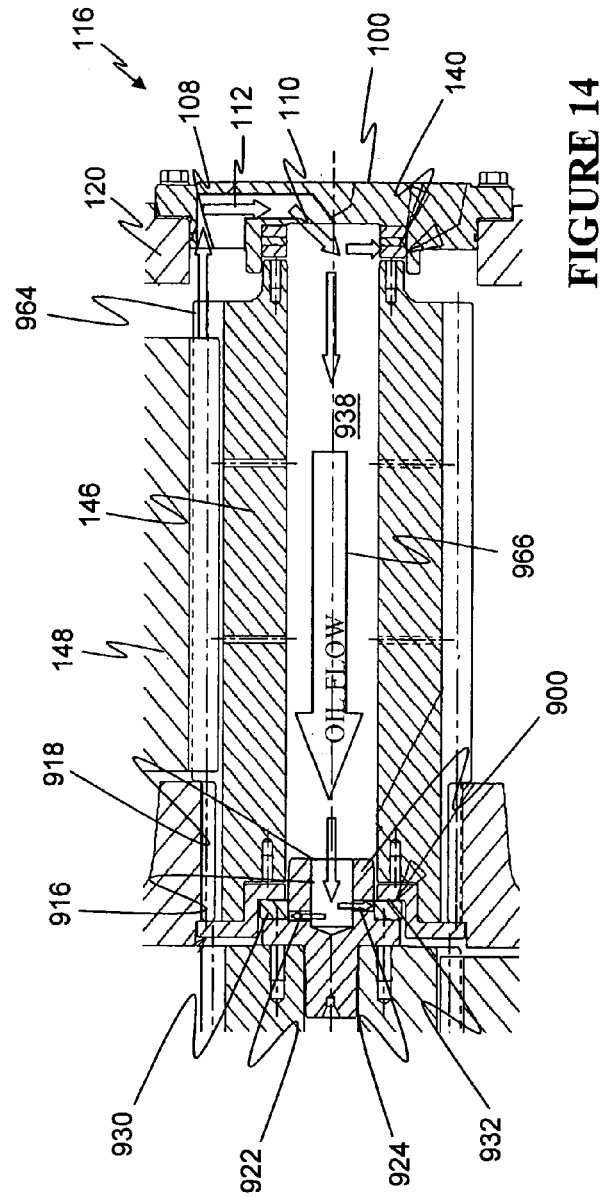

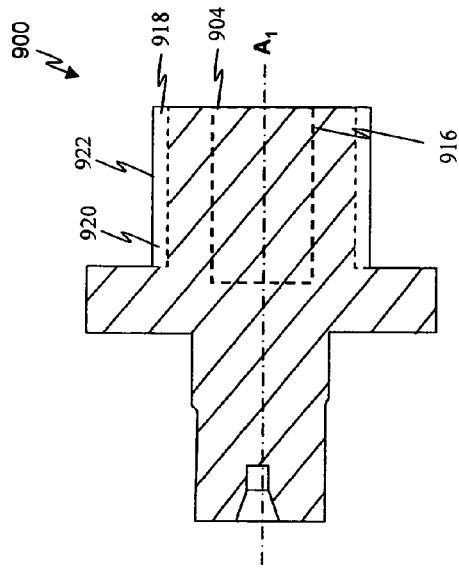
FIGURE 16
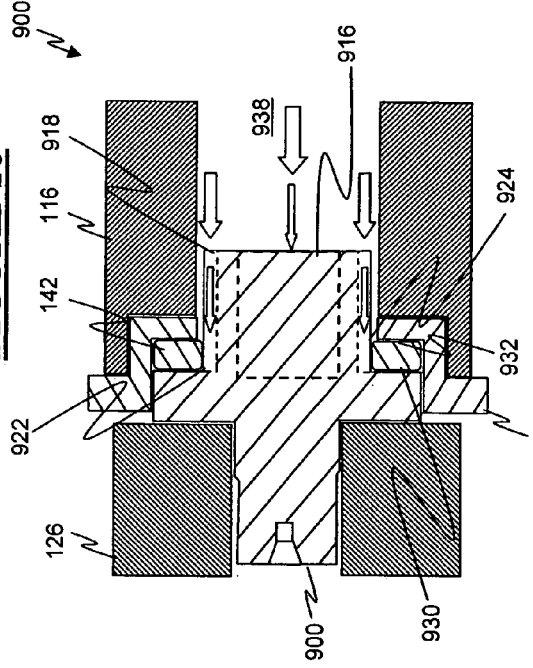
FIGURE 18
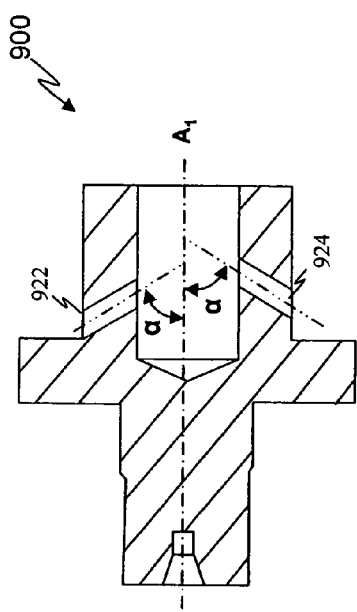
FIGURE 15
FIGURE 17

LUBRICATION PLUG

RELATED APPLICATIONS

This application is a Continuation-In-Part of U.S. patent application Ser. No. 11/056,989 filed Feb. 11, 2005 entitled "Sun Pinion Cover", and claims priority from co-pending U.S. patent application Ser. No. 11/056,989 filed Feb. 11, 2005 entitled "Sun Pinion Cover" and PCT Application No. PCT/US05/15589 filed May 4, 2005 entitled "Improved Lubrication in a Transmission," both of which depend from U.S. Provisional Patent Application Ser. No. 60/568,377 filed May 5, 2004, the contents of both of which are incorporated herein by reference in their entireties.

FIELD OF THE INVENTION

The present invention relates generally to the lubrication of a transmission and more particularly to an improved lubrication plug for an electric mining truck transmission.

BACKGROUND OF THE INVENTION

Large off-road, heavy-duty work vehicles, such as mining vehicles used to haul heavy payloads excavated from open pit mines, are well known and usually employ motorized wheels for propelling or retarding the vehicle in an energy efficient manner. This type of vehicle is shown in FIG. 1. This efficiency is typically accomplished by employing a large horsepower diesel engine in conjunction with an alternator and a main traction inverter. The diesel engine is directly associated with the alternator such that the diesel engine drives the alternator. The alternator is used to power the main traction inverter, wherein the main traction inverter supplies power having a controlled voltage and frequency to two drive or traction motors connected to the rear wheels of the vehicle. The motors may be either AC or DC operated. As each drive motor is operated, the drive motor causes a transmission drive shaft to rotate at a low torque and high speed about the drive shaft axis. Because the transmission drive shaft is directly associated with the vehicle transmission, the low torque high speed rotational energy of the transmission drive shaft is communicated to the vehicle transmission. The vehicle transmission then takes the low torque high speed rotational energy supplied by the transmission drive shaft and converts this energy into a high torque low speed rotational energy output which is supplied to the rear wheels.

Referring to FIG. 2, the conversion of this low torque high speed rotational energy into a high torque low speed rotational energy is typically accomplished using a double reduction gear set disposed within the vehicle transmission. A double reduction gear set is a series of gears, pinions and planets that includes a first reduction stage and a second reduction stage. The first reduction stage may include a high-speed sun pinion, a plurality of high-speed planets and a stationary ring gear and the second reduction stage may include a low-speed sun pinion, a plurality of low-speed planets and a stationary ring gear. The output of the first reduction stage is connected to the input of the second reduction stage and may be referred to as the high-speed carrier. In a similar manner, the output of the second reduction stage is connected to the vehicle wheels via a torque tube/hub assembly. Inward and outward thrust washers on the low-speed pinion act to enable rotation of the low-speed pinion relative to the high-speed pinion and the transmission housing, locate the high speed carrier within the transmission and to counter act any movement of the high speed carrier while reducing friction.

As described above, a transmission of this type includes a plurality of moving parts that interact and mesh with each other in order to convert the low torque high-speed energy into high torque low-speed energy. As such, it is essential to keep all of the parts of the transmission well lubricated to avoid undue wear and equipment failure. Currently, the components within the transmission are lubricated using a "splash" process. This "splash" process involves partially filling the torque tube/hub assembly with oil such that the lubrication is distributed to the transmission components during movement of the high-speed carrier, the low-speed carrier, the high-speed planets and the low-speed planets. As these components move, the lubricating oil contained within the torque tube that has adhered to these components splashes from the carriers onto the components contained in the transmission, such as the low-speed sun pinion. As the low-speed sun pinion and the high-speed planets mesh together, the oil that adheres to both gears during the "splash" process gets squeezed out of the mesh in the axial direction of the transmission, providing lubrication to additional parts of the transmission. This provides adequate lubrication to the radial outer surfaces of the thrust washers, but does not allow for adequate lubrication to the radial inner surfaces.

Although the above lubrication process provides for sufficient lubrication of all of the internal parts of the transmission, including key wear components, any additional oil flow to critical areas of the transmission would be advantageous and may provide an additional margin of safety for those wheels that may be subjected to additional loads due to application and/or working environment. This additional margin of safety is desirable as an additional precaution to prevent the need for frequent replacement of equipment parts and/or catastrophic failure of the equipment.

SUMMARY OF THE INVENTION

In an off-highway vehicle having an electric propulsion system, wherein the electric propulsion system includes a motorized wheel, a traction motor for delivering power to the motorized wheel and a transmission for transmitting power from the traction motor to the motorized wheel, wherein the transmission comprises a reduction stage, a low speed sun pinion defining a sun pinion cavity, and a thrust washer, wherein the thrust washer includes a first surface portion movably associated with the low speed sun pinion via a thrust washer retainer and wherein the thrust washer is movably associated with the reduction stage via a lubrication plug, the lubrication plug comprising: a first plug portion, wherein said first plug portion includes a radially extending portion movably associated with a second surface portion of the thrust washer; and a second plug portion having a second plug portion structure, wherein said second plug portion structure defines a plug cavity having a plug cavity inlet and at least one plug cavity outlet disposed adjacent at least a portion of the thrust washer, wherein said plug cavity inlet is disposed to communicate the sun pinion cavity with said plug cavity and wherein said at least one plug cavity outlet is disposed along at least one radial plane of said second plug portion to communicate said plug cavity with the thrust washer, such that a lubricant flowing through the sun pinion cavity and into said plug cavity inlet is allowed to flow out of said at least one plug cavity outlet such that said lubricant and the thrust washer lubricatingly interact.

A transmission assembly, comprising: a hub assembly, wherein said hub assembly defines a hub assembly cavity and a transmission opening, said transmission opening being communicated with said hub assembly cavity; a sun pinion, wherein said sun pinion defines a sun pinion cavity and includes a thrust washer retainer and wherein said sun pinion is disposed within said hub assembly cavity such that said transmission opening is further communicated with said sun pinion cavity; and a reduction stage having a lubrication plug, wherein said lubrication plug is movably associated with said thrust washer retainer via a thrust washer having a first surface portion and a second surface portion, said lubrication plug including, a first plug portion, wherein said first plug portion includes a radially extending portion movably associated with a second surface portion; and a second plug portion, wherein said second plug portion defines a plug cavity having a plug cavity inlet and at least one plug cavity outlet, wherein said plug cavity inlet is disposed to communicate said sun pinion cavity with said plug cavity and wherein said at least one plug cavity outlet is disposed along at least one radial plane of said second plug portion to communicate said plug cavity with said thrust washer, such that a lubricant flowing through said sun pinion cavity and into said plug cavity inlet is allowed to flow out of said at least one plug cavity outlet such that said lubricant and the thrust washer lubricatingly interact.

A method for increasing lubricant flow within an electric-motor driven, off-highway vehicle transmission, wherein the transmission includes a reduction stage, a low-speed sun pinion defining a sun pinion cavity and a thrust washer to enable relative rotation of the low-speed sun pinion and the reduction stage, wherein the thrust washer is movably associated with the sun pinion via a thrust washer retainer and wherein the thrust washer is movably associated with the reduction stage via a lubrication plug which is communicated with the sun pinion cavity, the method comprising: forming a lubricant conduction path between the sun pinion cavity and the thrust washer; and directing a lubricant to flow between the sun pinion cavity and the thrust washer via said lubricant conduction path to deliver lubricant to the thrust washer.

BRIEF DESCRIPTION OF THE DRAWING FIGURES

The foregoing and other features and advantages of the present invention will be more fully understood from the following detailed description of illustrative embodiments, taken in conjunction with the accompanying drawings in which like elements are numbered alike in the several Figures:

FIG. 12B is a front view of the lubrication plug of FIG. 9;

FIG. 13 is a block diagram illustrating a method for increasing lubricant flow within an electric-motor driven, in accordance with an exemplary embodiment;

FIG. 14 is a side cutout view of the transmission of FIG. 5 employing the sun pinion cover of FIG. 3 and the lubrication plug of FIG. 9; and FIG. 15 is a cross sectional side view of a lubrication plug, in accordance with a first alternative embodiment;

FIG. 16 is a cross sectional side view of a lubrication plug, in accordance with a second alternative embodiment;

FIG. 17 is a front view of the lubrication plug of FIG. 16; and

FIG. 18 is a cross sectional side view of the lubrication plug of FIG. 16 associated with the thrust washer of FIG. 11 and the transmission of FIG. 5.

DETAILED DESCRIPTION OF THE INVENTION

Figure 1:
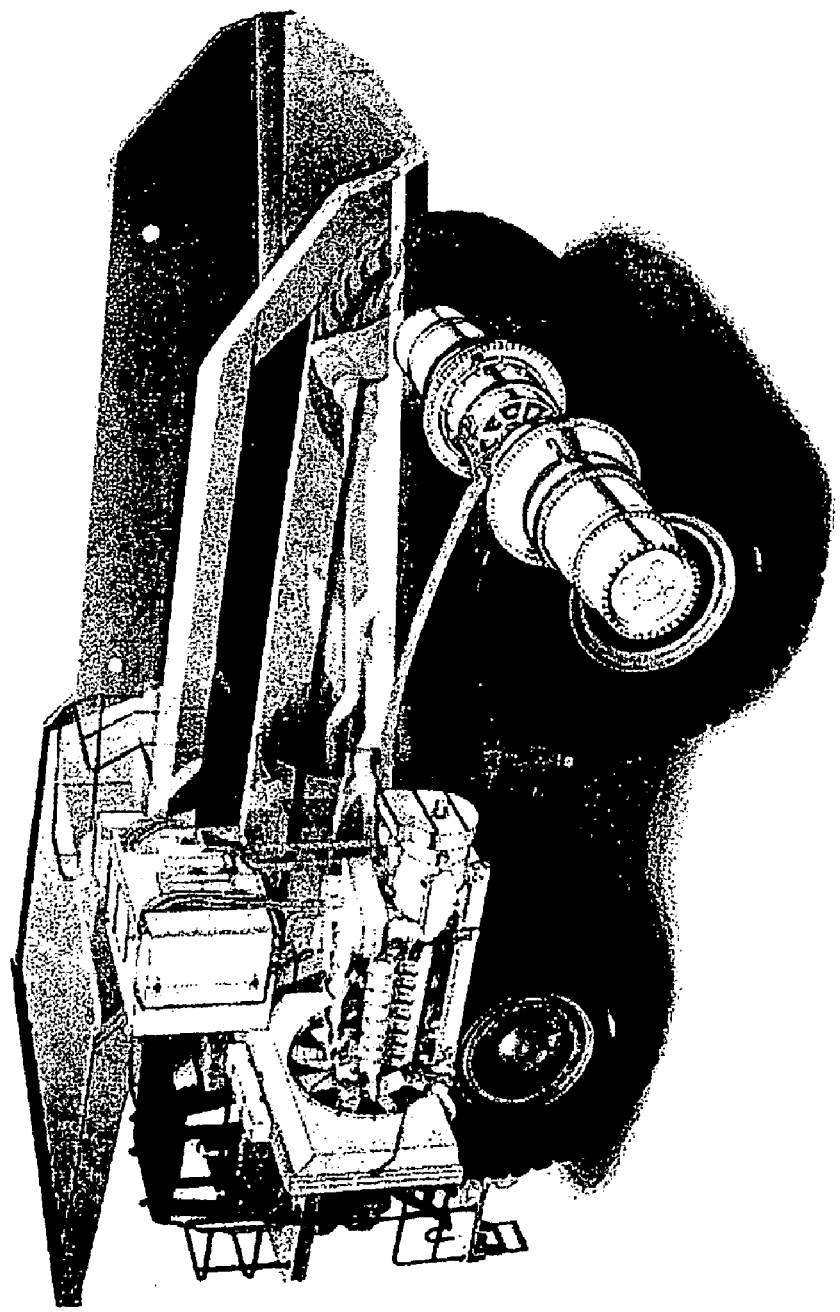
FIG. 1 is a side perspective view of an off-road, heavy-duty work vehicle of the type that uses an AC transmission.
Figure 2:
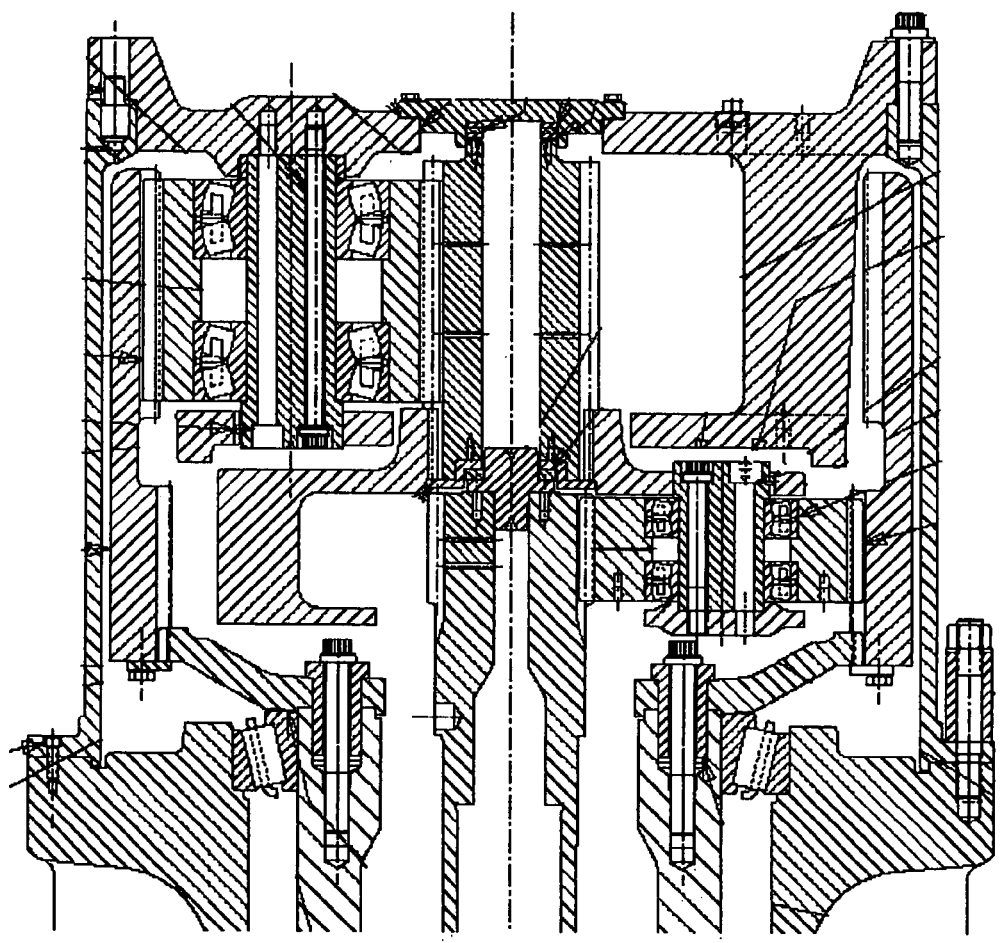
FIG. 2 is a cross sectional side view of a transmission having a sun pinion cover, in accordance with the prior art.
Figure 3:
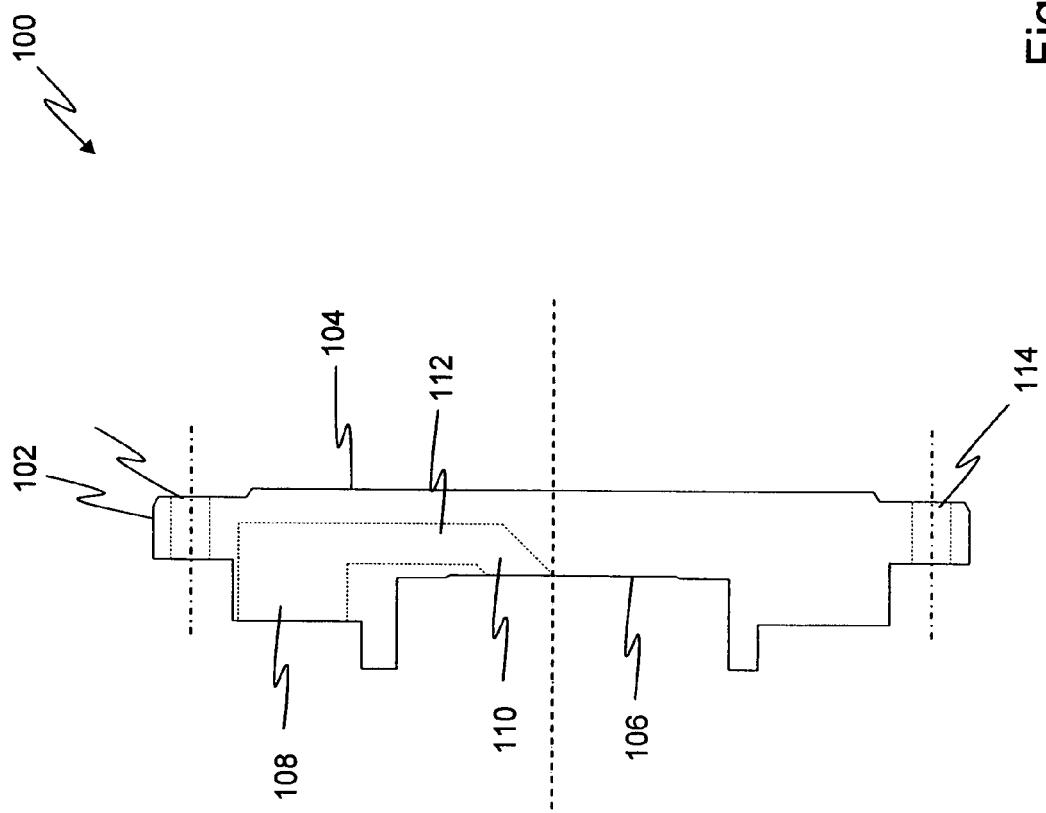
FIG. 3 is a cross sectional side view of a sun pinion cover, in accordance with a preferred embodiment.

Referring to FIG. 3, a sun pinion cover 100 is illustrated and includes a cover body structure 102 having a cover outer surface 104 and a cover inner surface 106. Cover inner surface 106 defines a lubricant inlet port 108 and a lubricant outlet port 110, wherein lubricant inlet port 108 is communicated with lubricant outlet port 110 via a lubricant conduction channel 112. Sun pinion cover 100 also defines at least one suitable fastener engagement hole, such as a bolt hole, 114 disposed to allow sun pinion cover 100 to be detachably secured to a transmission assembly hub.

Figure 4:
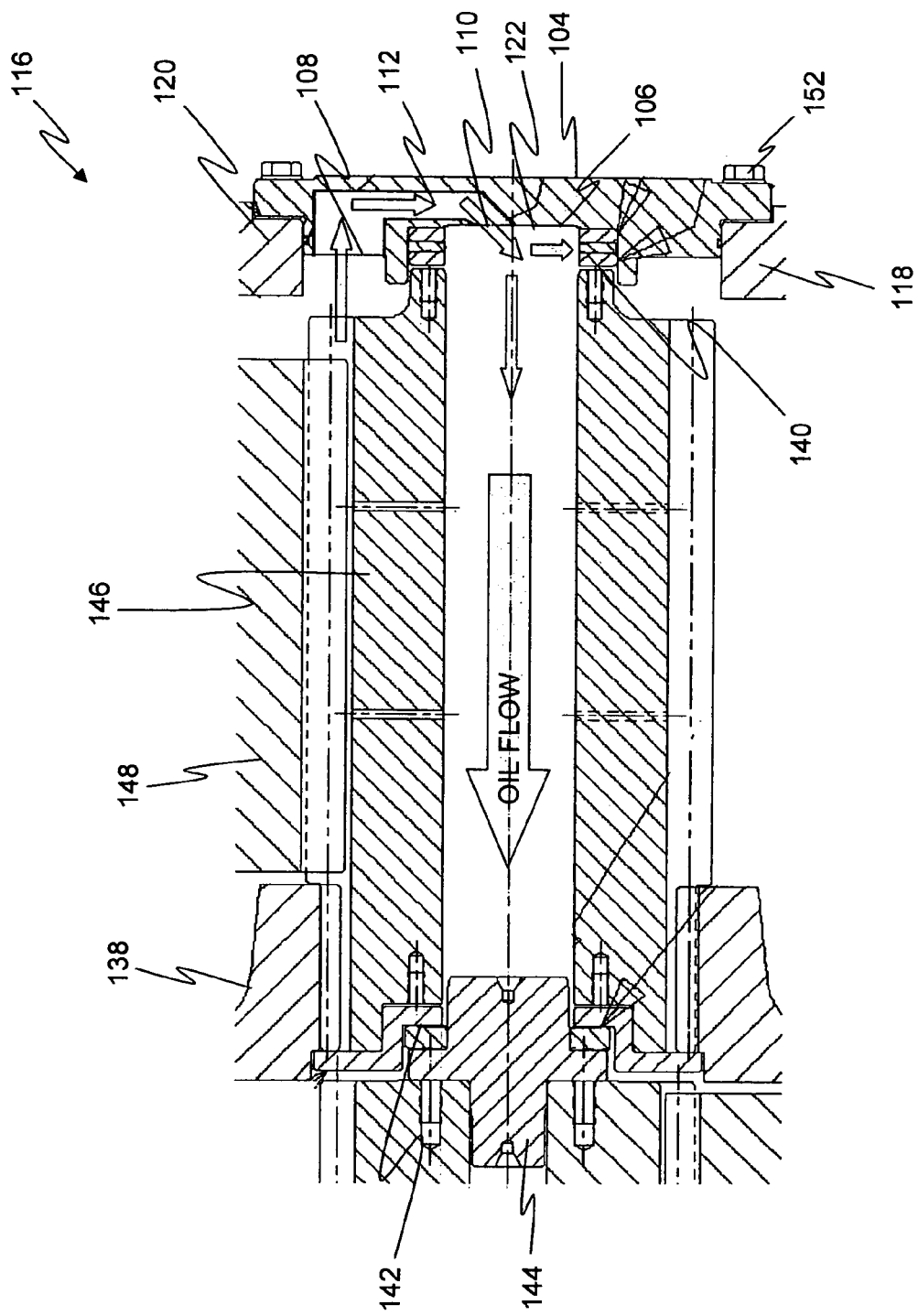
FIG. 4 is a side cutout view of a transmission employing the sun pinion cover of FIG. 3.
Figure 5:
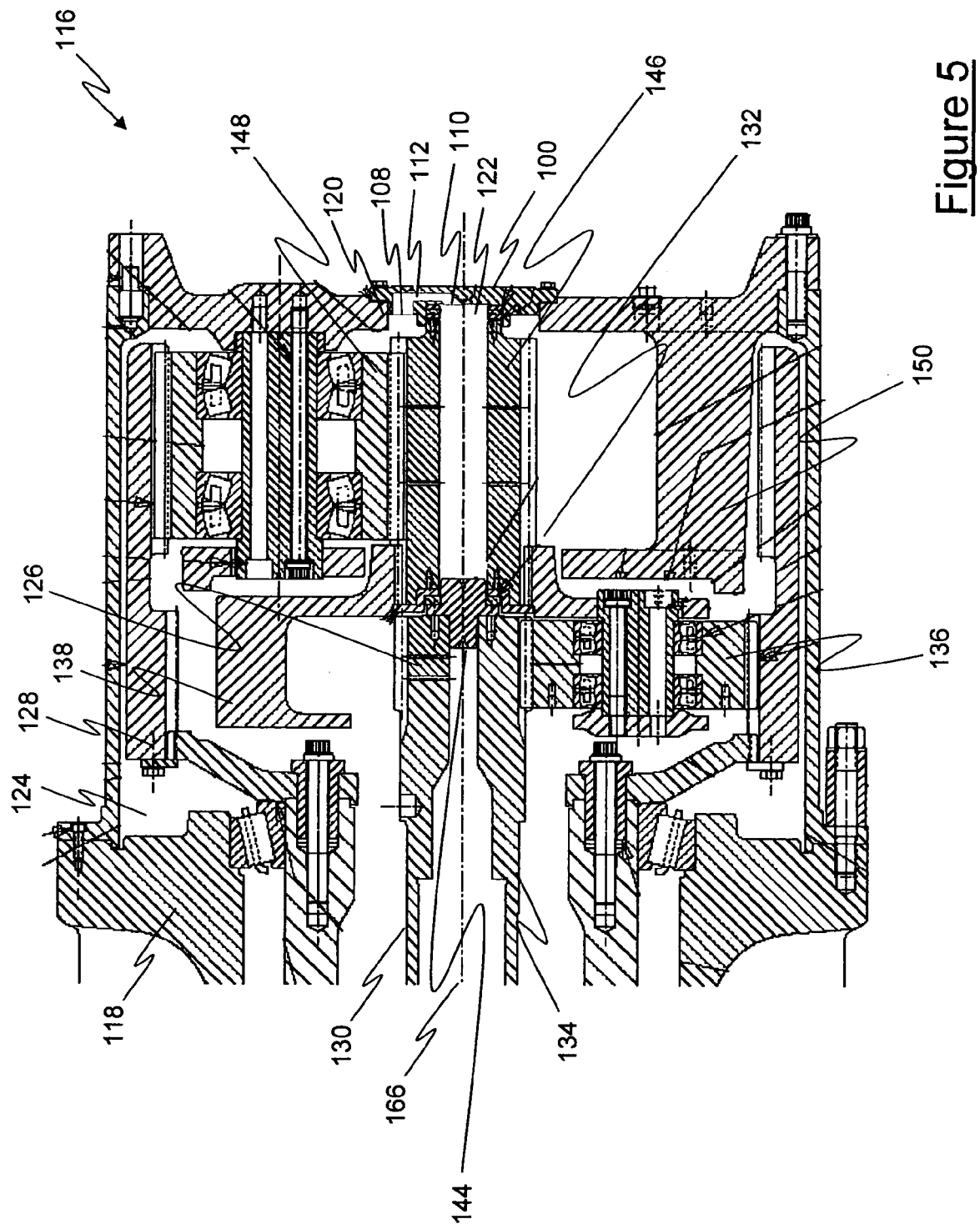
FIG. 5 is a side cutout view of a Transmission employing the sun pinion cover of FIG. 3.

Referring to FIG. 4 and FIG. 5, a sun pinion cover 100 is shown detachably secured with a transmission 116. Transmission 116 includes a hub assembly 118, which defines at least one hub mounting cavity 120, a transmission opening 122 and a hub assembly cavity 124, wherein transmission opening 122 is communicated with hub assembly cavity 124. Transmission 116 also includes a double reduction gear set 126 disposed within hub assembly cavity 124, wherein double reduction gear set 126 includes a stationary ring gear 128, a first reduction stage 130 and a second reduction stage 132. First reduction stage 130 includes a high-speed sun pinion 134, a plurality of high-speed planets 136 and a high-speed carrier 138, wherein high-speed carrier 138 transmits the output of first reduction stage 130 to second reduction stage 132. High-speed carrier 138 is disposed within transmission 116 such that its axial motion is restrained by an outboard thrust washer 140 riding on the cover inner surface 106 and an inboard thrust washer 142 riding on a plug 144.

Second reduction stage 132 includes a low-speed sun pinion 146, a plurality of low-speed planets 148 and a low-speed carrier 150, wherein low-speed sun pinion 146 is the input to second reduction stage 132 and receives the output of first reduction stage 130 from high-speed carrier 138. Low-speed carrier 150 receives the output of second reduction stage 132 and transmits this high torque output to the vehicle wheels. Sun pinion cover 100 is shown non-movably associated with hub assembly 118 via at least one mounting device 152 such that sun pinion cover 100 is disposed over transmission opening 122 to sealingly enclose hub assembly cavity 124. Moreover, sun pinion cover 100 is disposed relative to hub assembly 118 such that lubricant inlet port 108 is adjacent the plurality of low-speed planets 148 and such that lubricant outlet port 110 is adjacent low-speed sun pinion 146. This allows lubricant to flow between plurality of low-speed planets 148 and low-speed sun pinion 146 via lubricant conduction channel 112. The cover 100 may include two or more channels 112 at spaced intervals around the cover 100. While channel 112 is shown as being spaced from the inner surface 106 of the cover 100 to present a passage open only at ends of inlet 108 and outlet 110, the channel may alternatively be formed as a recess in the inner surface 106 of the cover 100 extending between the inlet 108 and the outlet 110.

Figure 6:
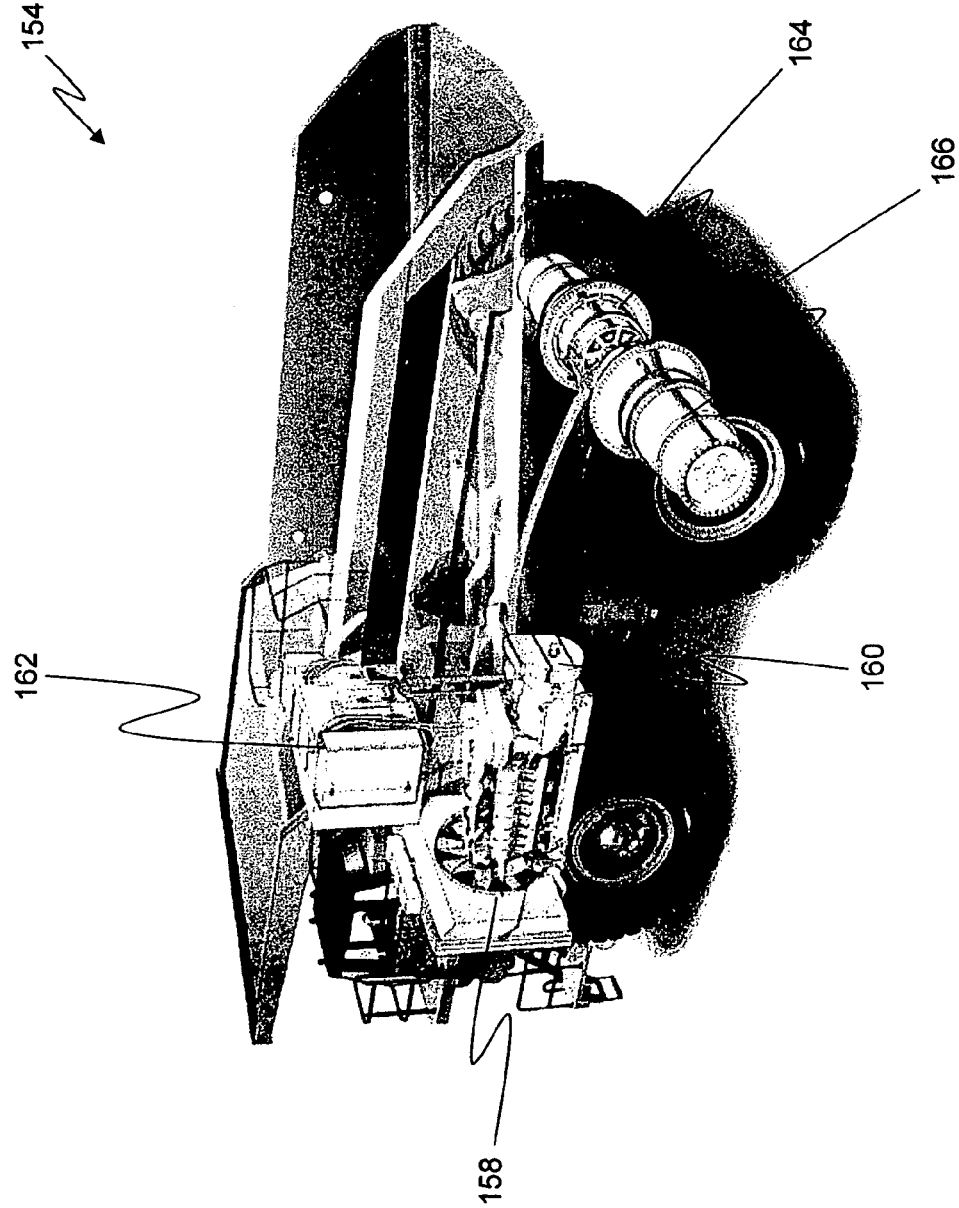
FIG. 6 is an additional side perspective view of an off-road, heavy-duty work vehicle of the type that uses a transmission.

Referring to FIG. 4, FIG. 5 and FIG. 6, an off-road, heavy-duty work vehicle 154 is shown and includes a large horsepower diesel engine 158 coupled to an alternator 160, a main traction inverter 162, at least one AC drive motor 164 and a transmission drive shaft 166. As the vehicle 154 is operated, diesel engine 158 drives alternator 160 to power main traction inverter 162. Main traction inverter 162 supplies power to AC drive motor 164, wherein main traction inverter 162 controls the voltage and frequency of the power supplied to AC drive motor 164. AC drive motor 164 converts this electrical energy into mechanical energy by causing transmission drive shaft 166 to rotate in relation to the power supplied to AC drive motor 164. The rotation of transmission drive shaft 166, which communicates AC drive motor 164 with high-speed sun pinion 134, transfers the mechanical energy from AC drive motor 164 to AC transmission 116.

As briefly discussed above, high-speed sun pinion 134 is part of first reduction stage 130. As such, because the rotation of transmission drive shaft 166 causes high-speed sun pinion 134 to rotate, the high-speed low torque mechanical energy from AC drive motor 164 is transferred into first reduction stage 130 via high-speed sun pinion 134. This high-speed low torque rotational energy is converted into lower-speed higher torque energy via first reduction stage 130 and transferred to second reduction stage 132 via low-speed sun pinion 146. The converted energy from first reduction stage 130 is converted further into low-speed high torque energy via second reduction stage 132. At this point, the low-speed high torque energy is transferred to the vehicle wheels via low-speed carrier 150. As the high-speed low torque energy received by AC transmission 116 is being converted into low-speed high torque energy, the components within AC transmission 116 are rapidly moving and interacting with each other.

When low-speed sun pinion 146 and low-speed planets 148 interact and mesh together, the lubricant that adheres to low-speed sun pinion 146 and low-speed planets 148 is compressed out of the mesh in the axial direction toward sun pinion cover 100. Because lubricant inlet port 108 is adjacent low-speed planets 148, the meshing of the low-speed planets and the sun-pinion provides a pumping action for directing lubricant into lubricant inlet port 108, through lubricant duct 112, out of lubricant outlet port 110 and into the central passage of low-speed sun pinion 146. This provides a continuous lubricant flow through the central passage of low-speed sun pinion 146 thus providing lubrication to outboard thrust washer 140 and inboard thrust washer 142. Lubricant flow to the inward and outward thrust washers thereby assures lubrication at the radial inner surfaces of these critical wear components for extending their useful lives.

Figure 7:
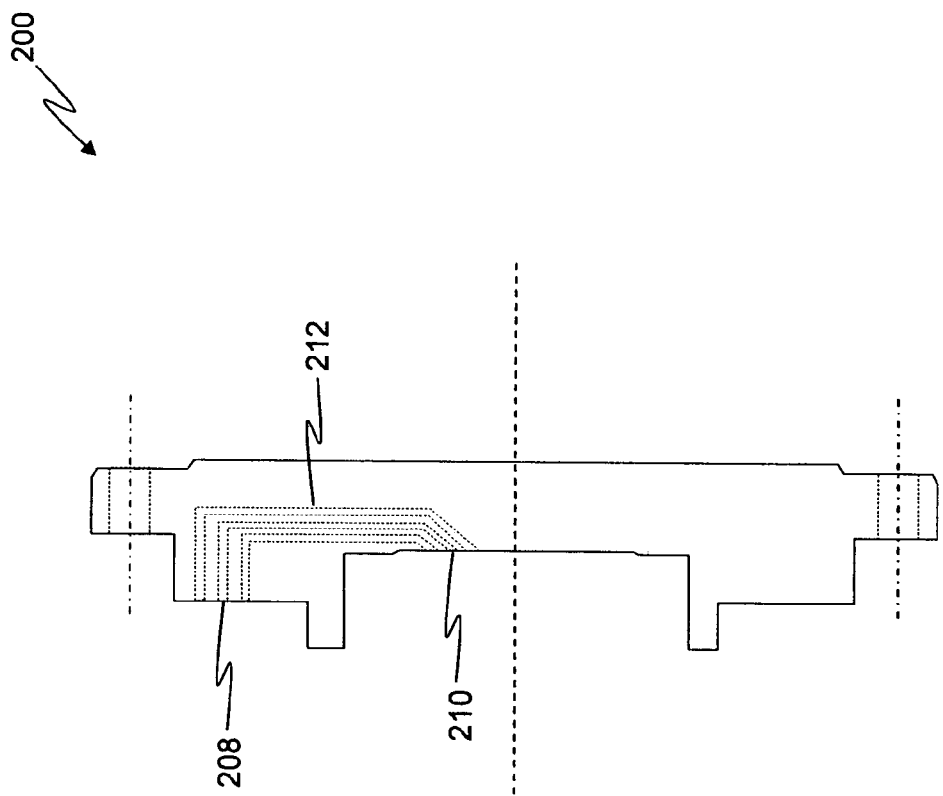
FIG. 7 is a cross sectional side view of a sun pinion cover, in accordance with a second embodiment.
Figure 8:
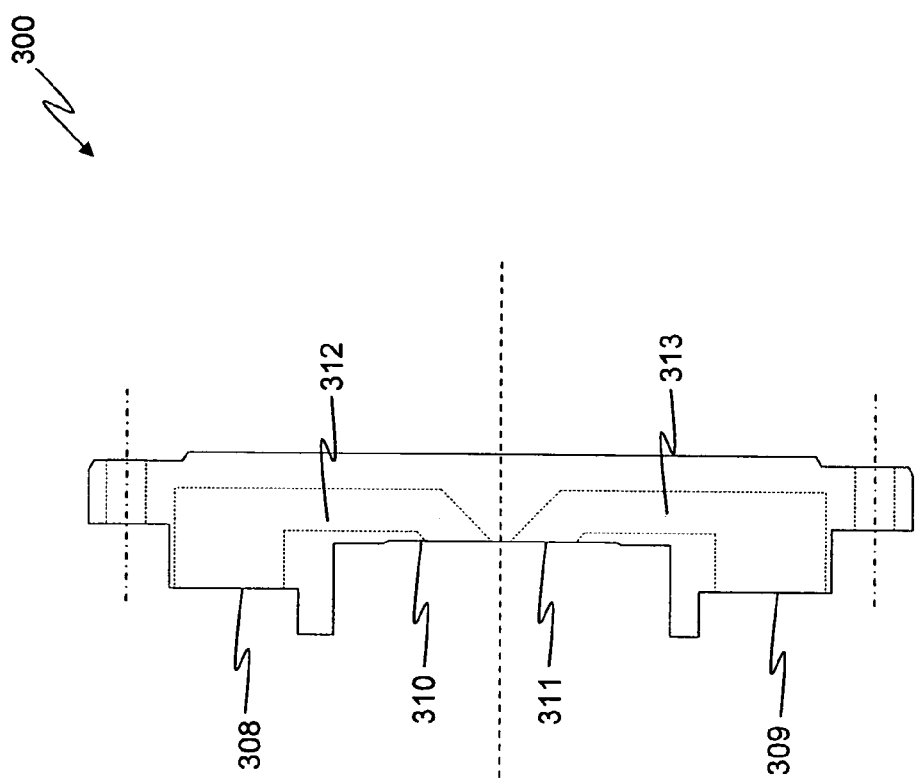
FIG. 8 is a cross sectional side view of a sun pinion cover, in accordance with a third embodiment.

Referring to FIG. 7, a second embodiment of sun pinion cover 200 is shown and includes a plurality of lubricant inlet ports 208, a plurality of lubricant outlet ports 210 and a plurality of lubricant ducts 212, wherein each of the plurality of lubricant inlet ports 108 are communicated with at least one of the plurality of lubricant outlet ports 210 via the plurality of lubricant ducts 212. Moreover, referring to FIG. 8, a third embodiment of sun pinion cover 300 is shown and includes a first lubricant inlet port 308, a second lubricant inlet port 309, a first lubricant outlet port 310 and a second lubricant outlet port 311, wherein the first lubricant inlet port 308 is communicated with the first lubricant outlet port 310 via a first lubricant duct 312 and wherein the second lubricant inlet port 309 is communicated with the second lubricant outlet port 311 via a second lubricant duct 313. It should be appreciated that a directional flow valve may be included and disposed to be communicated with the lubrication duct to control the direction of lubricant flow through the lubrication duct. Moreover, it should also be appreciated that although the sun pinion cover 100 is described herein as being associated with an AC transmission 116 having double reduction gear set 126, it should be appreciated that sun pinion cover 100 may be used with any type of transmission suitable to the desired end purpose.

Figure 9:
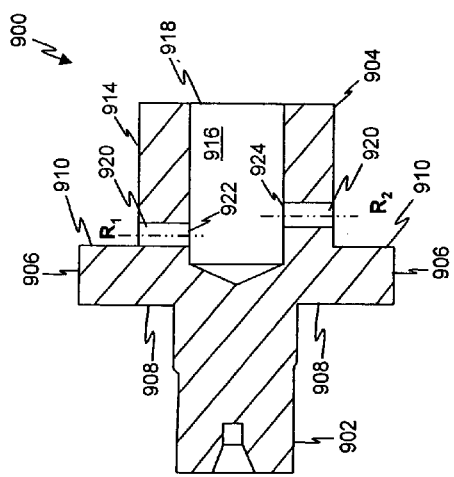
FIG. 9 is a cross sectional side view of a lubrication plug in accordance with an exemplary embodiment.

Referring to FIG. 9, a cross-sectional side view of a lubrication plug 900 is shown and includes a first plug portion 902 and a second plug portion 904. The first plug portion 902 includes a radially extending portion 906 having an extending portion inboard surface 908 and an extending portion outboard surface 910, wherein the lubrication plug 900 is nonmovably associated with the reduction gear set 126 via any method suitable to the desired end purpose, such as a press fit. The second plug portion 904 includes a second plug portion structure 914 which extends away from the radially extending portion 906 and which defines a plug cavity 916 having at least one plug cavity inlet 918 and at least one plug cavity outlet 920, wherein the at least one plug cavity outlet 920 is communicated with the at least one plug cavity inlet 918 via the plug cavity 916. It should be appreciated that the at least one plug cavity outlet 920 includes at least one inboard plug cavity outlet 922 disposed along a first radial plane $R_1$ of the second plug portion 904 and at least one outboard plug cavity outlet 924 disposed along a second radial plane $R_2$ of the second plug portion 904.

Figure 11:
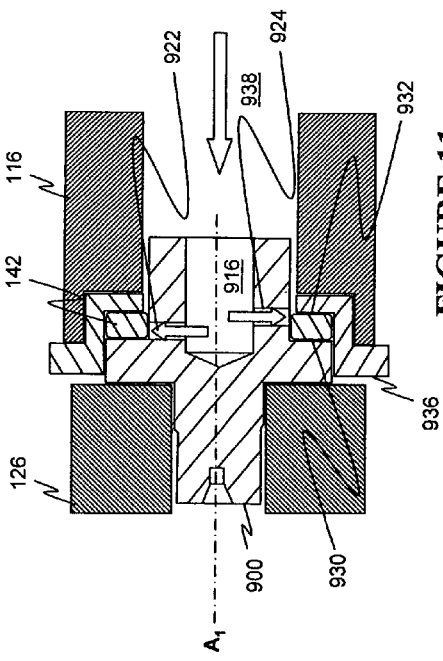
FIG. 11 is a cross sectional side view of the lubrication plug of FIG. 10 associated with the thrust washer of FIG. 11 and the transmission of FIG. 5.
Figure 10:
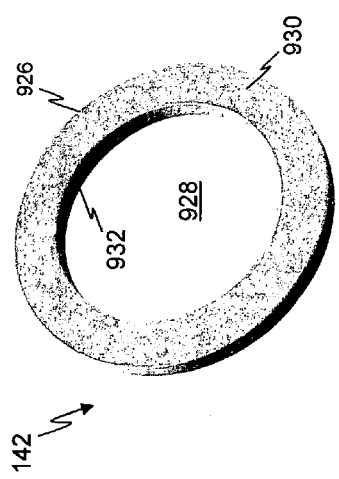
FIG. 10 is a front perspective view of a thrust washer for use with the lubrication plug of FIG. 9.

Referring to FIG. 10, a front perspective view of the inboard thrust washer 142 is shown, wherein the inboard thrust washer 142 includes an inboard thrust washer structure 926 which defines an inboard thrust washer cavity 928 and includes a first thrust washer surface 930 and a second thrust washer surface 932. Referring to FIG. 11, a cross sectional side view of the lubrication plug 900 is shown disposed within the transmission 116 to be associated with the reduction gear set 126 and the inboard thrust washer 142. The lubrication plug 900 may be associated with the reduction gear set 126 via any method and/or device suitable to the desired end purpose, such as being press fit together to frictionally interact together. The inboard thrust washer 142 is movably associated with the lubrication plug 900 such that at least a portion of the second plug portion 904 is disposed within the inboard thrust washer cavity 928 and such that the first thrust washer surface 930 of the inboard thrust washer 142 is adjacent to the extending portion outboard surface 910 of the radially extending portion 906. Additionally, the inboard thrust washer 142 is movably associated with the low speed sun pinion 146 via a thrust washer retainer 936 such that the second thrust washer surface 932 of the inboard thrust washer 142 is adjacent the thrust washer retainer 936, wherein the low speed sun pinion 146 defines a sun pinion cavity 938. It should be appreciated that when lubrication plug 900 and the inboard thrust washer 142 are associated with the transmission 116, the inboard thrust washer 142 is disposed such that the first thrust washer surface 930 is adjacent the inboard plug cavity outlet 922 and the second thrust washer surface 932 is adjacent the outboard plug cavity outlet 924. This allows a lubricant to flow between the sun pinion cavity 938 and the first thrust washer surface 930 and the second thrust washer surface 932 via the lubrication plug cavity 916.

Figure 12A:
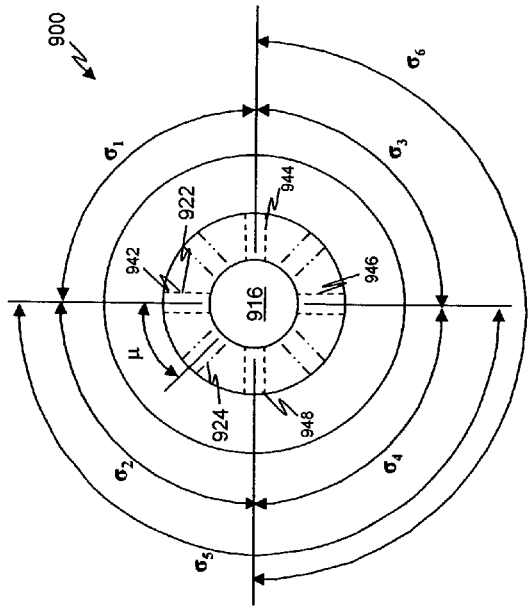
FIG. 12A is a front view of the lubrication plug of FIG. 9.

Referring to FIG. 12A, the at least one inboard plug cavity outlet 922 may include a first plug interface outlet 942, a second plug interface outlet 944, a third plug interface outlet 946 and a fourth plug interface outlet 948, each of which are disposed radially along the first radial plane $R_2$ of the second plug portion 904. The first plug interface outlet 942 may be disposed at an angle $\sigma_1$ from the second plug interface outlet 944 and an angle $\sigma_2$ from the fourth plug interface outlet 948. The third plug interface outlet 946 may be disposed at an angle $\sigma_3$ from the second plug interface outlet 944 and an angle $\sigma_4$ from the fourth plug interface outlet 948. Moreover, the first plug interface outlet 942 may be disposed at an angle $\sigma_5$ from the third plug interface outlet 946 and the second plug interface outlet 944 may be disposed at an angle $\sigma_6$ from the fourth plug interface outlet 948.

In a similar fashion referring to FIG. 12B, the at least one outboard plug cavity outlet 924 may include a first retainer interface outlet 950, a second retainer interface outlet 952, a third retainer interface outlet 954 and a fourth retainer interface outlet 956 each of which are disposed radially along the second radial plane $R_1$ of the first plug portion 902. As above, the first retainer interface outlet 950 may be disposed at an angle $\beta_1$ from the second retainer interface outlet 952 and an angle $\beta_2$ from the fourth retainer interface outlet 956, the third retainer interface outlet 954 may be disposed at an angle $\beta_3$ from the second retainer interface outlet 952 and an angle $\beta_4$ from the fourth retainer interface outlet 956, the first retainer interface outlet 950 may be disposed at an angle $\beta_5$ from the third retainer interface outlet 954 and the second retainer interface outlet 952 may be disposed at an angle $\beta_6$ from the fourth retainer interface outlet 956. Moreover, referring to FIGS. 12A and 12B, the at least one inboard plug cavity outlet 922 may be disposed to be radially offset by an angle $\mu$ relative to the at least one outboard plug cavity outlet 924.

Referring to FIG. 13, a block diagram illustrating a method 958 for increasing lubricant flow 952 within an electric-motor driven, off-highway vehicle transmission 116 is shown, wherein the transmission 116 includes a reduction stage 126, a low-speed sun pinion 146 defining a sun pinion cavity 938 and an inboard thrust washer 142 to enable relative rotation of the low-speed sun pinion 146 and the reduction stage 126. The inboard thrust washer 142 is movably associated with the low-speed sun pinion 146 via a thrust washer retainer 936 and wherein the inboard thrust washer 142 is movably associated with the reduction stage 126 via the lubrication plug 900 which is communicated with the sun pinion cavity 938. The method 958 includes forming a lubricant conduction path 952 between the sun pinion cavity 938 and the inboard thrust washer 142, as shown in operational block 960, and directing a lubricant to flow between the sun pinion cavity 938 and the thrust washer 142 via the lubricant conduction path to deliver lubricant to the thrust washer 142, as shown in operational block 962. This may be accomplished by modifying the lubrication plug 900 to define a plug cavity 916 having a plug inlet 918 and at least one plug outlet 920, wherein the plug inlet 918 is disposed to be communicated with the sun pinion cavity 938 and wherein the at least one plug outlet 920 is disposed to be communicated with at least a portion of the thrust washer 142. The plug cavity 916, which may be defined by the lubrication plug 900, is shown as being disposed to be communicated with the sun pinion cavity 938, wherein the plug cavity 916 includes the inboard plug cavity outlet 922 and the outboard plug cavity outlet 924.

Referring to FIG. 14, the transmission 116 is shown having the sun pinion cover 100 and the lubrication plug 900. As the transmission 116 is operated, the low-speed sun pinion 146 and the low-speed planets 148 interact and mesh together. This causes the lubricant 964 that adheres to the low-speed sun pinion 146 and the low-speed planets 148 to be compressed out of the mesh in the axial direction toward the sun pinion cover 100. Because the lubricant inlet port 108 is adjacent the low-speed planets 148, the meshing of the low-speed planets 148 and the low-speed sun pinion 146 provides a pumping action for directing the lubricant 964 into the lubricant inlet port 108, through the lubricant duct 112, out of the lubricant outlet port 110 and into the sun pinion cavity 938 of the low-speed sun pinion 146. This directs a continuous lubricant flow 940 into and through the sun pinion cavity 938 to provide lubrication to the outboard thrust washer 140. The continuous lubricant flow 966 also directs the lubricant 964 through the plug cavity inlet 918, into the plug cavity 916 and out of the at least one inboard plug cavity outlet 922 and the at least one outboard plug cavity outlet 924 to lubricantly interact with at least one of the first thrust washer surface 930 and the second thrust washer surface 932.

Although the at least one inboard plug cavity outlet 922 and the at least one outboard plug cavity outlet 924 are shown as being oriented 90° (perpendicular) relative to an axial plane $A_1$ of the lubrication plug 900, it should be appreciated that at least one of the at least one inboard plug cavity outlet 922 and the at least one outboard plug cavity outlet 924 may be oriented at an angle relative to the axial plane $A_1$ suitable to the desired end purpose. For example, referring to FIG. 15, a first alternative embodiment of the lubrication plug 900 is shown and includes the at least one inboard plug cavity outlet 922 and the at least one outboard plug cavity outlet 924, wherein the at least one inboard plug cavity outlet 922 and the at least one outboard plug cavity outlet 924 are oriented at a predetermined angle, $\alpha$, relative to the axial plane $A_1$. Additionally, referring to FIG. 16 and FIG. 17, a second alternative embodiment of the lubrication plug 900 is shown and includes at least one plug cavity 916 having at least one plug cavity inlet 918 and at least one plug cavity outlet 920, wherein the at least one plug cavity 916 is disposed adjacent the exterior portion of the second plug portion structure 914 and extends radially along an axial plane $A_1$ of the lubrication plug 900.

Referring to FIG. 18, as the transmission 116 is operated the low-speed sun pinion 146 and the low-speed planets 148 interact and mesh together. This causes the lubricant that adheres to low-speed sun pinion 146 and the low-speed planets 148 to be compressed out of the mesh in the axial direction toward the sun pinion cover 100. Because lubricant inlet port 108 is adjacent the low-speed planets 148, the meshing of the low-speed planets 148 and the low-speed sun pinion 146 provides a pumping action for directing the lubricant into lubricant inlet port 108, through lubricant duct 112, out of lubricant outlet port 110 and into the sun pinion cavity 938 of the low-speed sun pinion 146. This directs a continuous lubricant flow 940 into and through the sun pinion cavity 938 to provide lubrication to the inboard thrust washer 142. The continuous lubricant flow 940 also directs the lubricant flow 940 through the plug cavity inlet 918, into the plug cavity 916 and out of the at least one inboard plug cavity outlet 922 and the at least one outboard plug cavity outlet 924 to lubricantly interact with at least one of the first thrust washer surface 930 and the second thrust washer surface 932.

It should be appreciated that although angles $\sigma_1$, $\sigma_2$, $\sigma_3$, $\sigma_4$, $\beta_1$, $\beta_2$, $\beta_3$ and $\beta_4$, are shown as being approximately 90°, angles $\sigma_5$, $\sigma_6$, $\beta_5$ and $\beta_6$ are shown as being approximately 180°, angle $\mu$ is shown as being approximately 45° and $\alpha$ is shown as being approximately 60°, each one of angles $\sigma_1$, $\sigma_2$, $\sigma_3$, $\sigma_4$, $\sigma_5$, $\sigma_6$, $\beta_1$, $\beta_2$, $\beta_3$, $\beta_4$, $\beta_5$, $\beta_6$, $\mu$ and $\alpha$ may ba any angle suitable to the desired end purpose.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A lubrication plug for an off-highway vehicle having an electric propulsion system, wherein the electric propulsion system includes a motorized wheel, a traction motor for delivering power to the motorized wheel and a transmission for transmitting power from the traction motor to the motorized wheel, wherein the transmission comprises a reduction stage, a low speed sun pinion defining a sun pinion cavity, and a thrust washer, wherein the thrust washer includes a second surface portion movably associated with the low speed sun pinion via a thrust washer retainer and wherein the thrust washer is movably associated with the reduction stage via the lubrication plug, the lubrication plug comprising:
a first plug portion, wherein said first plug portion includes a radially extending portion movably associated with a first surface portion of the thrust washer; and
a second plug portion having a second plug portion structure, wherein said second plug portion structure defines a plug cavity having a plug cavity inlet and at least one plug cavity outlet disposed adjacent at least a portion of the thrust washer, wherein said plug cavity inlet is disposed to communicate the sun pinion cavity with said plug cavity and wherein said at least one plug cavity outlet is disposed along at least one radial plane of said second plug portion to communicate said plug cavity with the thrust washer, such that a lubricant flowing through the sun pinion cavity and into said plug cavity inlet is allowed to flow out of said at least one plug cavity outlet such that said lubricant and the thrust washer lubricatingly interact.

2. The lubrication plug of claim 1, wherein said at least one plug outlet includes at least one retainer interface outlet and at least one plug interface outlet, wherein said at least one retainer interface outlet includes a first retainer interface outlet, a second retainer interface outlet, a third retainer interface outlet and a fourth retainer interface outlet and wherein said at least one plug interface outlet includes a first plug interface outlet, a second plug interface outlet, a third plug interface outlet and a fourth plug interface outlet.

3. The lubrication plug of claim 1, wherein said at least one plug outlet includes at least one plug interface outlet, wherein when the lubrication plug is associated with the electric propulsion system to be disposed adjacent the thrust washer, said at least one plug interface outlet communicates said plug cavity with the first surface portion.

4. The lubrication plug of claim 3, wherein said at least one plug interface outlet includes a first plug interface outlet, a second plug interface outlet, a third plug interface outlet and a fourth plug interface outlet and wherein said at least one radial plane includes a plug interface plane.

5. The lubrication plug of claim 4, wherein each of said first plug interface outlet, said second plug interface outlet, said third plug interface outlet and said fourth plug interface outlet are disposed radially along said second plug portion structure to be disposed within said plug interface plane.

6. The lubrication plug of claim 5, wherein said first plug interface outlet is disposed at an angle $\sigma_1$ from said second plug interface outlet and an angle $\sigma_2$ from said fourth plug interface outlet and wherein said third plug interface outlet is disposed at an angle $\sigma_3$ from said second plug interface outlet and at an angle $\sigma_4$ from said fourth plug interface outlet and wherein said first plug interface outlet is disposed at an angle $\sigma_5$ from said third plug interface outlet.

7. The lubrication plug of claim 6, wherein said angle $\sigma_1$, said angle $\sigma_2$, said angle $\sigma_3$ and said angle $\sigma_4$ is 90° and wherein said angle $\sigma_5$ and said angle $\sigma_6$ is 180°.

8. The lubrication plug of claim 1, wherein said at least one plug outlet includes at least one retainer interface outlet, wherein when the lubrication plug is associated with the electric propulsion system to be disposed adjacent the thrust washer, said at least one retainer interface outlet communicates said plug cavity with said second surface portion.

9. The lubrication plug of claim 8, wherein said at least one retainer interface outlet includes a first retainer interface outlet, a second retainer interface outlet, a third retainer interface outlet and a fourth retainer interface outlet and wherein said at least one radial plane includes a retainer interface plane.

10. The lubrication plug of claim 9, wherein each of said first retainer interface outlet, said second retainer interface outlet, said third retainer interface outlet and said fourth retainer interface outlet are disposed radially along said second plug portion structure to be within said retainer interface plane.

11. The lubrication plug of claim 10, wherein said first retainer interface outlet is dispose at an angle $\beta_1$ from said second retainer interface outlet and an angle $\beta_2$ from said fourth retainer interface outlet said and wherein said third retainer interface outlet is disposed at an angle $\beta_3$ from said second retainer interface outlet and an angle $\beta_4$ from said fourth retainer interface outlet and wherein said first retainer interface outlet is disposed at an angle $\beta_5$ from said third retainer interface outlet.

12. The lubrication plug of claim 11, wherein said angle $\beta_1$, said angle $\beta_2$, said angle $\beta_3$ and said angle $\beta_4$ is 90° and wherein said angle $\beta_5$ and said angle $\beta_6$ is 180°.

13. The lubrication plug of claim 1, wherein said at least one plug outlet includes at least one retainer interface outlet and at least one plug interface outlet, wherein said at least one plug interface outlet is radially disposed at an angle $\mu$ from said at least one retainer interface outlet.

14. The lubrication plug of claim 13, wherein said angle $\mu$ is approximately 45°.

15. A transmission assembly, comprising:
a hub assembly, wherein said hub assembly defines a hub assembly cavity and a transmission opening, said transmission opening being communicated with said hub assembly cavity;
a sun pinion, wherein said sun pinion defines a sun pinion cavity and includes a thrust washer retainer and wherein said sun pinion is disposed within said hub assembly cavity such that said transmission opening is further communicated with said sun pinion cavity; and
a reduction stage having a lubrication plug, wherein said lubrication plug is movably associated with said thrust washer retainer via a thrust washer having a first surface portion and a second surface portion, said lubrication plug including, a first plug portion, wherein said first plug portion includes a radially extending portion movably associated with a first surface portion; and a second plug portion, wherein said second plug portion defines a plug cavity having a plug cavity inlet and at least one plug cavity outlet, wherein said plug cavity inlet is disposed to communicate said sun pinion cavity with said plug cavity and wherein said at least one plug cavity outlet is disposed along at least one radial plane of said second plug portion to communicate said plug cavity with said thrust washer, such that a lubricant flowing through said sun pinion cavity and into said plug cavity inlet is allowed to flow out of said at least one plug cavity outlet such that said lubricant and the thrust washer lubricatingly interact.

16. The transmission assembly of claim 15, wherein said at least one plug outlet includes at least one retainer interface outlet and at least one plug interface outlet, wherein said at least one retainer interface outlet includes a first retainer interface outlet, a second retainer interface outlet, a third retainer interface outlet and a fourth retainer interface outlet and wherein said at least one plug interface outlet includes a first plug interface outlet, a second plug interface outlet, a third plug interface outlet and a fourth plug interface outlet.

17. The transmission assembly of claim 15, wherein said at least one plug outlet includes at least one plug interface outlet, wherein when the lubrication plug is associated with an electric propulsion system of an off-highway vehicle to be disposed adjacent the thrust washer, said at least one plug interface outlet communicates said plug cavity with the first surface portion.

18. The transmission assembly of claim 17, wherein said at least one plug interface outlet includes a first plug interface outlet, a second plug interface outlet, a third plug interface outlet and a fourth plug interface outlet and wherein said at least one radial plane includes a plug interface plane.

19. The transmission assembly of claim 18, wherein each of said first plug interface outlet, said second plug interface outlet, said third plug interface outlet and said fourth plug interface outlet are disposed radially along said second plug portion structure to be within said plug interface plane.

20. The transmission assembly of claim 19, wherein said first plug interface outlet is disposed at an angle $\sigma_1$ from said second plug interface outlet and an angle $\sigma_2$ from said fourth plug interface outlet and wherein said third plug interface outlet is disposed at an angle $\sigma_3$ from said second plug interface outlet and at an angle $\sigma_4$ from said fourth plug interface outlet and wherein said first plug interface outlet is disposed at an angle $\sigma_5$ from said third plug interface outlet.

21. The transmission assembly of claim 15, wherein said at least one plug outlet includes at least one retainer interface outlet, wherein when the lubrication plug is associated with an electric propulsion system of an off-highway vehicle to be disposed adjacent the thrust washer, said at least one retainer interface outlet communicates said plug cavity with said second surface portion.

22. The transmission assembly of claim 21, wherein said at least one retainer interface outlet includes a first retainer interface outlet, a second retainer interface outlet, a third retainer interface outlet and a fourth retainer interface outlet and wherein said at least one radial plane includes a retainer interface plane.

23. The transmission assembly of claim 22, wherein each of said first retainer interface outlet, said second retainer interface outlet, said third retainer interface outlet and said fourth retainer interface outlet are disposed radially along said second plug portion structure to be disposed within said retainer interface plane.

24. The transmission assembly of claim 23, wherein said first retainer interface outlet is dispose at an angle $\beta_1$ from said second retainer interface outlet and an angle $\beta_2$ from said fourth retainer interface outlet said and wherein said third retainer interface outlet is disposed at an angle $\beta_3$ from said second retainer interface outlet and an angle $\beta_4$ from said fourth retainer interface outlet and wherein said first retainer interface outlet is disposed at an angle $\beta_5$ from said third retainer interface outlet.

25. The transmission assembly of claim 15, wherein said at least one plug outlet includes at least one retainer interface outlet and at least one plug interface outlet, wherein said at least one plug interface outlet is radially disposed at an angle $\mu$ from said at least one retainer interface outlet.

26. The transmission assembly of claim 25, wherein said angle $\mu$ is approximately 45°.

27. A method for increasing lubricant flow within an electric-motor driven, off-highway vehicle transmission, wherein the transmission includes a reduction stage, a low-speed sun pinion defining a sun pinion cavity and a thrust washer to enable relative rotation of the low-speed sun pinion and the reduction stage, wherein the thrust washer is movably associated with the sun pinion via a thrust washer retainer and wherein the thrust washer is movably associated with the reduction stage via a lubrication plug which is communicated with the sun pinion cavity, the method comprising:

forming a lubricant conduction path between the sun pinion cavity and the thrust washer; and directing a lubricant to flow between the sun pinion cavity and the thrust washer via said lubricant plug, said lubricant plug configured to include a lubricant conduction path to deliver lubricant to the thrust washer.

28. The method of claim 27, wherein said creating a lubrication path includes, modifying said the lubrication plug to define a plug cavity having a plug inlet and at least one plug outlet, wherein said plug inlet is disposed to be communicated with the sun pinion cavity and wherein said at least one plug outlet is disposed to be communicated with at least a portion of the thrust washer.

* * * * *